United States Patent [19]
Davidson et al.

[11] Patent Number: 5,375,234
[45] Date of Patent: Dec. 20, 1994

[54] DATA DICTIONARY MANAGER FOR MAINTAINING AN ACTIVE DATA DICTIONARY

[75] Inventors: William S. Davidson, Oronoco; Kurt W. Eggerling, Rochester, both of Minn.

[73] Assignee: International Business Machines Corporation, Armonk, N.Y.

[21] Appl. No.: 188,668

[22] Filed: Jan. 28, 1994

Related U.S. Application Data

[63] Continuation of Ser. No. 815,670, Dec. 31, 1991, abandoned.

[51] Int. Cl.$^5$ .............................................. G06F 15/40
[52] U.S. Cl. ............................... 395/600; 364/DIG. 1; 364/282.1; 364/253; 364/253.1; 364/253.3; 364/283.4; 364/282.3
[58] Field of Search ................ 395/575, 600, 650, 700, 395/800

[56] References Cited

U.S. PATENT DOCUMENTS

| | | | |
|---|---|---|---|
| 4,507,751 | 3/1985 | Gawlick et al. | 395/575 |
| 4,774,661 | 9/1988 | Kumpati | 364/300 |
| 5,008,786 | 4/1991 | Thatte | 364/200 |
| 5,043,866 | 8/1991 | Myre, Jr. et al. | 364/200 |
| 5,095,421 | 3/1992 | Freund | 395/650 |
| 5,128,885 | 7/1992 | Janis et al. | 395/575 |
| 5,133,075 | 7/1992 | Risch | 395/800 |
| 5,151,987 | 9/1992 | Abraham et al. | 395/575 |
| 5,151,988 | 9/1992 | Yamagishi | 395/600 |
| 5,155,850 | 10/1992 | Janis et al. | 395/600 |
| 5,185,887 | 2/1993 | Takahashi et al. | 395/600 |
| 5,210,868 | 5/1993 | Shimada et al. | 395/600 |
| 5,293,615 | 3/1994 | Amada | 395/600 |
| 5,307,487 | 4/1994 | Tavares et al. | 395/650 |

OTHER PUBLICATIONS

Loomis M. et al. 'Fundamentals of Integrated Dictionary/Directory Systems' Information & Management, vol. 4, 1981, North-Holland Publishing Company pp. 287–295.

Primary Examiner—Kevin A. Kriess
Attorney, Agent, or Firm—Steven W. Roth

[57] ABSTRACT

The data dictionary manager takes advantage of the computer system's journaling capability enhanced to allow users and application programs to manipulate system objects without the use of the data dictionary's built-in utilities. As used here, journaling capability is an internal tracking facility which exists in a somewhat limited form on many computer systems. Typical journaling mechanisms maintain a repository of information about some of the activities that have taken place on the computer system. The information is usually stored in a record called an audit journal. Since many computer systems have limited journaling mechanisms already in place, these mechanisms can be enhanced to add the ability to record information about changes to system objects. Examples of system object changes included in the audit journal are deletes, creates, renames, and moves. Once the information has been logged in the audit journal, the data dictionary manager retrieves the information from the audit journal and ensures that the changes are accurately reflected in the data dictionary. Since the audit journal can be made accessible to several processes, it is possible to have different instances of the data dictionary manager responsible for different data dictionaries. Alternatively, it is possible to have a single data dictionary manager that is responsible for all of the computer system's data dictionaries.

21 Claims, 7 Drawing Sheets

| Time 300 | Date 310 | Journal Entry Type 320 | Object ID 330 | User ID 340 | Data 345 |
|---|---|---|---|---|---|
| 210020 | 123191 | PW | 1122 | 9900 | aaaaaaaaaaaa |
| 212001 | 123191 | DO | 3344 | 8800 | dddddd |
| 223617 | 123191 | OM | 5566 | 7700 | ffffffffffffff |
| 224545 | 123191 | CK | | | |
| 225500 | 123191 | OW | 7788 | 6600 | gggggggggg bbbbbbbbbbbbbbbb |
| 230509 | 123191 | CO | 2211 | 5500 | |
| 235543 | 123191 | OR | 3322 | 4400 | iiii |
| 235959 | 123191 | CT | | | |
| . | . | . | . | . | . |

Audit Journal

FIG. 2B

- AF — All authority failures.
- PW — Invalid password entered from device.
- RP — Restore of programs that adopt their owners user profile.
- RJ — Restore of Job Descriptions that contain user names.
- RO — Restore of objects when ownership information changes.
- RA — Restore of objects when authority changes.
- RU — Restore of authority for user profiles.
- CA — Changes to object authority. Object or Authorization list.
- CP — Creates/Changes/Delete/Display/Restore of user profiles.
- DS — DST security officer password reset.
- OW — Changes to object ownership.
- PA — Changes to programs (CHGPGM) that will now adopt the owners profile.
- PS — Profile handle generated via QSYGETPH API.
- SV — Changes to system values.
- NA — Changes to network attributes.
- SE — Changes to subsystem routing.
- DO — All deletes on the system.
- JD — Creates or Changes to the USER parameter of a JOB.
- CO — A journal entry type for object creates.
- OM — A journal entry type for object management changes (Move, Rename).
- OR — A journal entry type for the object restore.
- CK — Checkpoint journal entry for recovery.
- CT — Commit journal entry for recovery.
- •  •  •  •  •  •  •  •  •  •  •  •  •  •  •  •  •  •  •  •  •  •  •

Journal Entry Types

FIG. 2C

DATA DICTIONARY MANAGER FOR MAINTAINING AN ACTIVE DATA DICTIONARY

This application is continuation of Ser. No. 07/815,670 filed Dec. 31, 1991, now abandoned.

BACKGROUND OF THE INVENTION

This invention involves the management of a data dictionary in a computer system and the system objects that it tracks. A data dictionary is defined in the IBM Dictionary of Computing as "[a] centralized repository of information about data such as meaning, relationships to other data, origin, usage, and format." As such, a data dictionary is not unlike the standard dictionary of a spoken language (e.g., Webster's Collegiate Dictionary). Both the data dictionary and the standard dictionary contain information about certain items. The difference between the two concepts is the type of items that are involved. The items of interest in the standard dictionary are words; whereas, the items of interest in the data dictionary are called objects. An object can be a particular file or record, an instance of software (i.e., a program), or some other important system resource. The data dictionary is used by the computer system to keep track of the status of these important system resources. The benefit of using a data dictionary is, in a word, control. Ideally, the exact status of every system resource is known at all times. With this control, however, is the associated problem of ensuring that the data dictionary has current information regarding every object. To analogize this situation to that of the standard dictionary, one need only consider the importance of having an up to date dictionary. Newer words and/or definitions are often lacking in older dictionaries. As the dictionary becomes more and more out of date, it becomes less and less valuable. The problem is amplified in data dictionaries because, as opposed to words, the computer system's objects are constantly being modified.

To deal with this problem, typical data dictionary designs include various built-in mechanisms that perform both the modification of the objects and the associated change to the data dictionary. That is, when a user or an application program requires that a change be made to a particular object, an interface to the data dictionary is used to make the change. Then, an internal mechanism of the data dictionary will automatically make the associated dictionary changes. The problem with these current implementations is that to be kept active, they require that all modifications be carried out through their built-in utilities. This results in decreased flexibility. Application programs are limited to potentially inadequate mechanisms to access various system resources. Further, since data dictionary utilities must themselves gain access to system resources through operating system utilities, overall system performance is adversely affected.

Another problem inherent in existing data dictionary designs is the exposure to massive inaccuracies. Since existing data dictionary designs require that all changes to dictionary defined objects be made through built-in utilities, they are not aware of changes which occur outside of their sphere of control. This means that when changes of this type do occur, the data dictionary cannot be depended upon as an accurate reflection of the state of system objects. This problem is amplified when one considers that in some cases the only solution is a time consuming system reload which in and of itself may result in the loss of data.

SUMMARY OF THE INVENTION

It is a principal object of this invention to provide an enhanced method and apparatus for the management of a data dictionary.

It is another object of this invention to provide a method and apparatus for managing a data dictionary which provides for more synchronization between a data dictionary and the existing system environment by tracking changes to system objects regardless of how the changes are effectuated.

It is still another object of this invention to provide an enhanced dictionary management method and apparatus which can be adjusted to provide the user with more flexibility in choosing the degree of synchronization.

It is still another object of this invention to provide an enhanced dictionary management method and apparatus for improving the overall integrity of the data dictionary by alerting the system administrator of any threats to the data dictionary's integrity.

These and other objects are accomplished by the data dictionary manager disclosed herein.

The data dictionary manager takes advantage of the computer system's journaling capability enhanced to allow users and application programs to manipulate system objects without the use of the data dictionary's built-in utilities. As used here, journaling capability is an internal tracking facility which exists In a somewhat limited form on many computer systems. Typical journaling mechanisms maintain a repository of information about some of the activities that have taken place on the computer system. The information is usually stored in a record called an audit journal. Since many computer systems have limited journaling mechanisms already in place, these mechanisms can be enhanced to add the ability to record information about changes to system objects. Examples of system object changes included in the audit journal are deletes, creates, renames, and moves.

Once the information has been logged in the audit journal, the data dictionary manager retrieves the information from the audit journal and ensures that the changes are accurately reflected in the data dictionary. Since the audit journal can be made accessible to several processes, it is possible to have different instances of the data dictionary manager responsible for different data dictionaries. Alternatively, it is possible to have a single data dictionary manager that is responsible for all of the computer system's data dictionaries.

Since information about changes to system objects is recorded at the operating system level, the present invention does not share the inflexibility problems of existing data dictionary implementations. Modifications to system objects can be made without the use of built-in utilities and without the loss of synchronization between the data dictionary and the state of system objects. To realize this flexibility, the recorded information includes any and all changes that have been made to system objects.

Although the information could be stored in another manner, the existing audit journal provides the easiest and most cost effective repository for the information. The invention provides further flexibility by allowing the user (system administrator) of the data dictionary manager to control exactly how accurately the data dictionary reflects the current state of system objects.

This control is achieved by making the data dictionary manager responsive to both user stimulus and adjustable system timers.

This is beneficial in that it allows the system administrator to adjust the data dictionary manager to best handle changing system requirements.

The data dictionary manager is further responsible for alerting the system administrator of potential problems with the configuration of the system's journaling mechanism. The data dictionary manager accomplishes this by monitoring system values to detect any system changes that may impact the integrity of the data dictionary. This capability allows the system administrator to correct any problems before they become catastrophic.

BRIEF DESCRIPTION OF THE DRAWINGS

FIGS. 2A, 2B and 2C show how the various entities of a computer system interrelate to keep the data dictionary up to date with system activities according to the preferred embodiment.

DESCRIPTION OF THE PREFERRED EMBODIMENT

Figure 1:
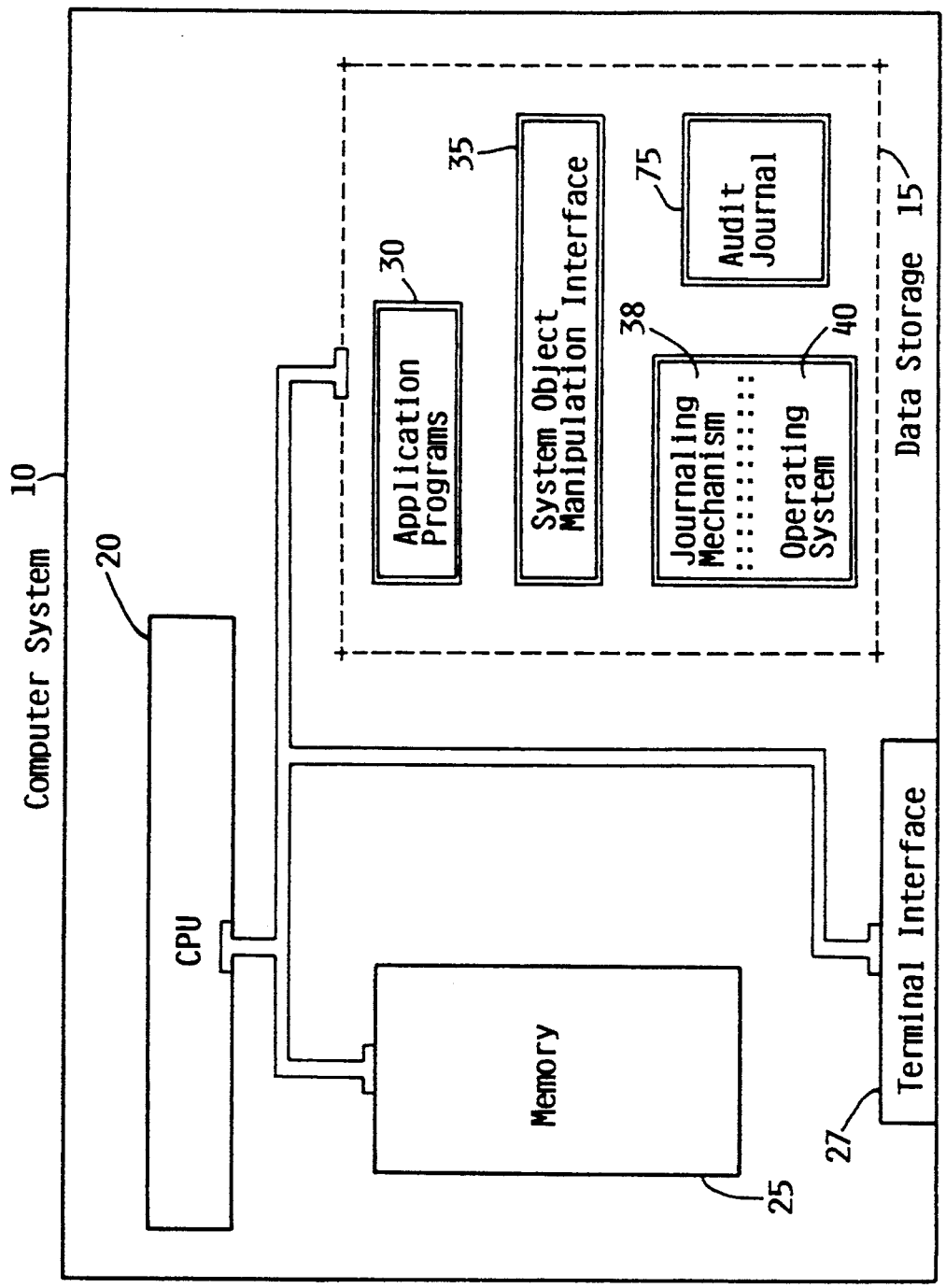
FIG. 1 shows the computer system of the preferred embodiment.

FIG. 1 shows a block diagram of a typical computer system suitable for operation of the present invention. In the preferred embodiment, computer system 10 is an IBM Application System/400 midrange computer; however, other systems such as personal computers and mainframe computer systems could also be used. Contained within computer system 10 are data storage 15, CPU 20, memory 25, and terminal interface 27. Data storage 15, as secondary memory, may be a magnetic disk drive, an optical storage device, or a combination of different storage devices. CPU 20 is responsible for executing the software programs that have been loaded into memory 25. Terminal interface 27 allows developers and users to communicate with computer system 10, normally through a programmable workstation.

Data storage 15 contains application programs 30, system object manipulation interface 35, audit journal 75, and operating system 40. Operating system 40 further contains journaling mechanism 38. While storage 15 is shown as a monolithic entity, it should be understood that it may comprise a variety of devices, and that all programs and files shown will not necessarily be contained in any one device. For example, portions of application programs 30 and operating system 40 will typically be loaded into primary memory 25 to execute, while source data files will typically be stored on magnetic or optical disk storage devices.

Figure 2A:
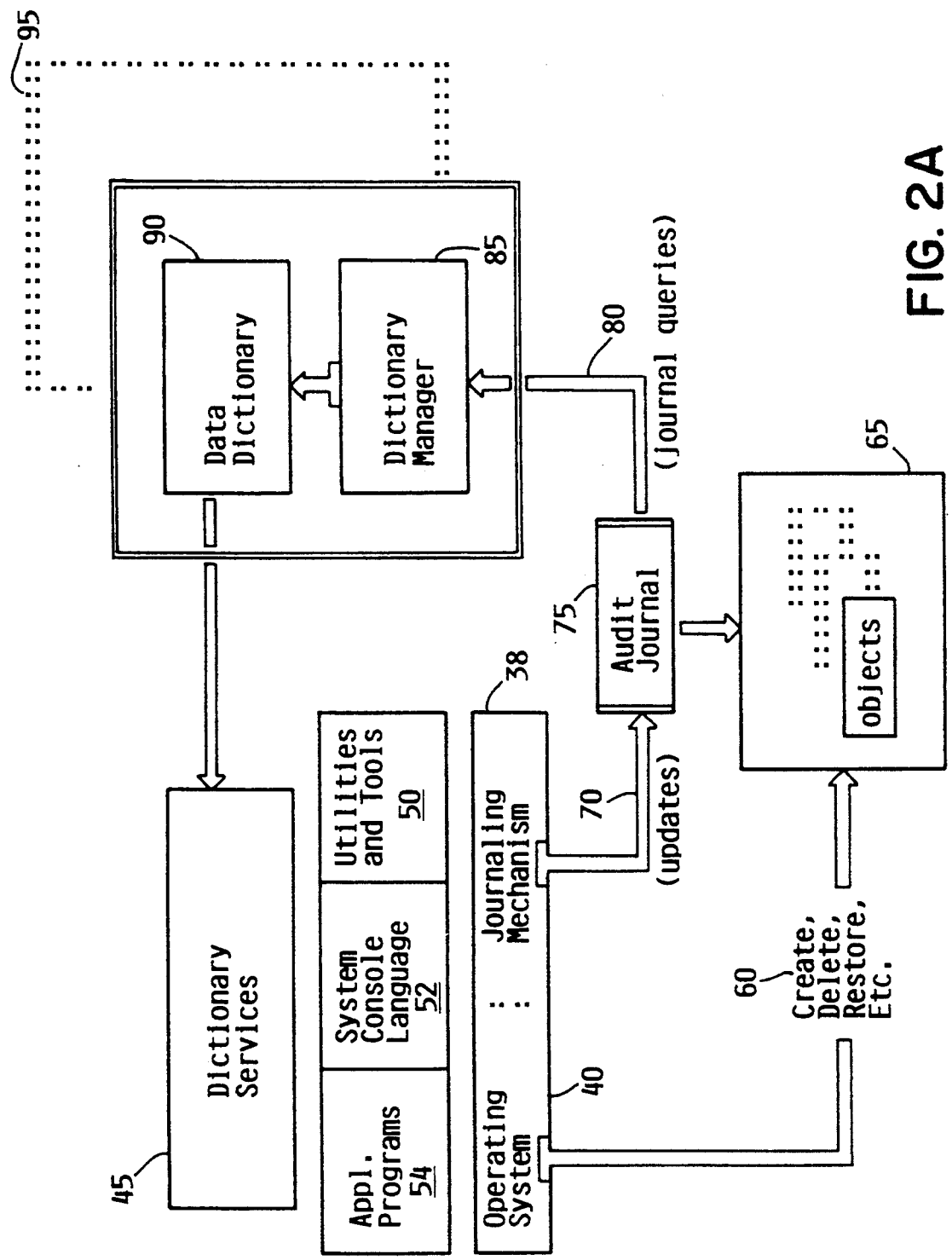

FIG. 2 shows how the separate conceptual entities of computer system 10 work together to maintain active data dictionary 90. As mentioned above, one purpose of the invention is to keep data dictionary 90 up to date with changes to system objects without necessarily involving dictionary services 45. This capability is enabled by the journaling mechanism 38. As mentioned above, journaling mechanism 38, as a part of operating system 40, is used by computer systems to track (i.e., keep a journal of) various system activities. Since journaling mechanism 38 is a "low level" program, all changes made by higher level routines are know to it. Information about selected changes are sequentially recorded in audit journal 75. Audit journal 75 is shown in FIG. 2B. Each entry 75 is made up of a series of entries. Each entry has a time 300, a date 310, a journal entry type 320, an object ID 330, a user ID 340, and data 350. Time 300 and date 310 indicate the time in which journaling mechanism 38 logged the particular entry. Journal entry type 320 indicates what type of entry is involved (e.g., DO is a delete entry). The journal entry types of the preferred embodiment are shown in FIG. 2C. Object ID 330 identifies the object for which the particular entry pertains. User ID 340 identifies the user or task which made 10 the subject change. Data 350 includes information which is particular to the subject change. For example, for a create entry (CO) data 350 would include ale the information involved in the creation of the object identified by object ID 2211.

In some cases, an existing journaling mechanism may need to be augmented to provide additional information about changes to system objects. In the preferred embodiment, journaling mechanism 38 is first initialized to ensure that all necessary activities are tracked. The particular activities that are tracked include object deletes, object creates, object moves, object renames and object restores. In addition, journaling mechanism 38 tracks changes that occur to its configuration. This allows; data dictionary manager 85 to take appropriate action when a necessary activity is no longer being tracked by journaling mechanism 38.

Logical blocks 50, 52, and 54 depict three possible classes of software entities that can co-exist with dictionary manager 85. Each block represents a program or utility that is independently capable of performing changes to system objects through direct interaction with operating system 40. Since operating system 40 is always used to effectuate the change, journaling mechanism 38 is able to maintain an accurate record of all the changes by placing change entries in audit journal 75. For example, if application programs 54 need to create a system object (e.g., a queue), they simply invoke the appropriate routine within operating system 40. Journaling mechanism 38, aware that an object has been created, records the occurrence of the change in audit journal 75. It is then the responsibility of data dictionary manager 85 to retrieve the information from audit journal 75 and update data dictionary 90 accordingly. In this manner, data dictionary 90 is kept abreast of the changes in the system environment regardless of how they are effectuated.

Figure 3:
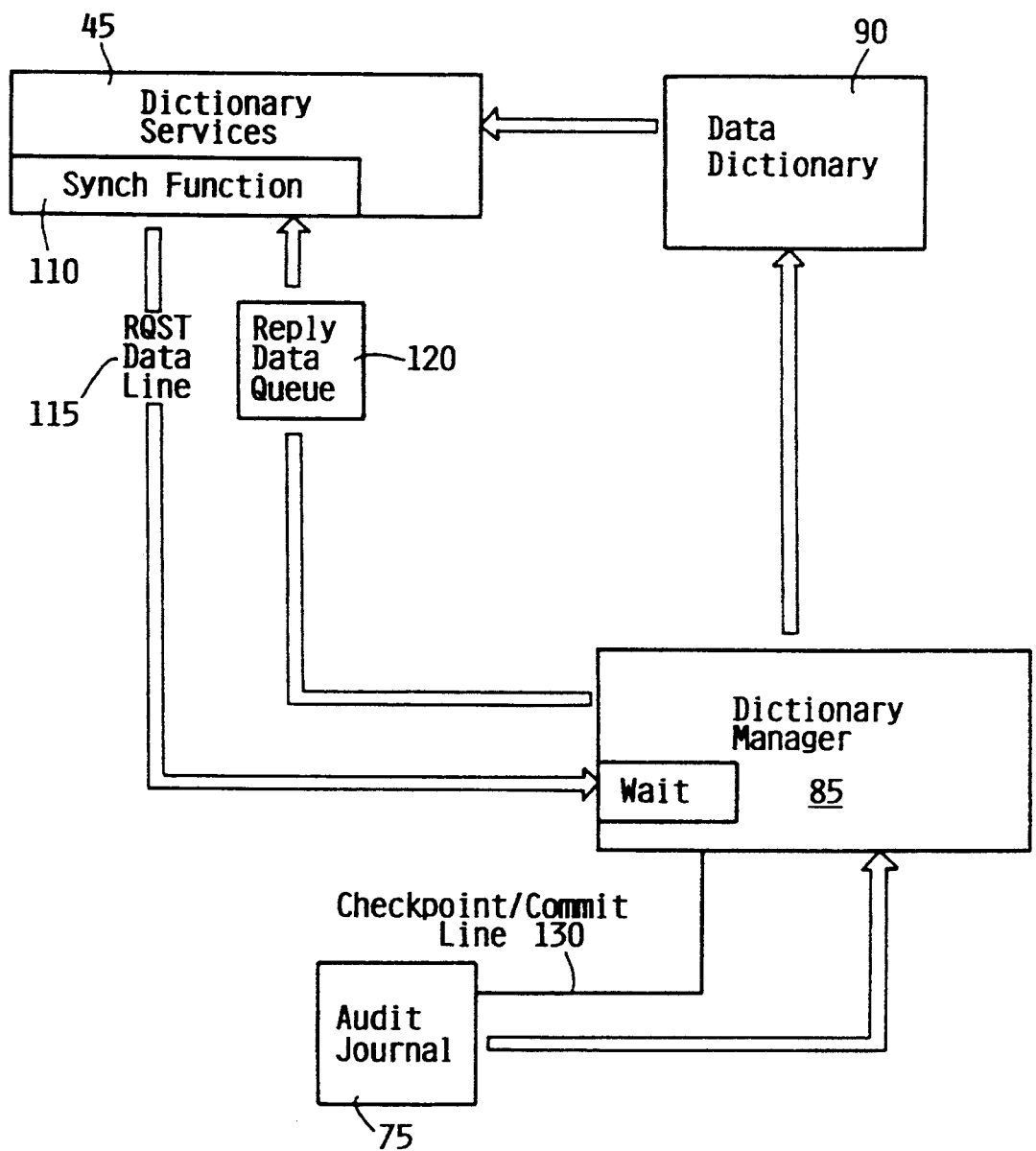
FIG. 3 shows how the data dictionary manager interacts with the dictionary services and the audit journal to keep the data dictionary up to date with the state of system objects according to the preferred embodiment.

FIG. 3 shows the interaction of data dictionary manager 85, dictionary services 45, and audit journal 75 in greater detail. As mentioned above, data dictionary manager 85 is responsible for interrogating audit journal 75 from time to time and ensuring that changes to system objects are reflected in data dictionary 90. The interrogation and updating can be performed at predefined intervals, or when triggered by requests for data dictionary information, or on some other basis. The choice of lag time between the occurrence of a change to a system object and the reflection of that change in data dictionary 90 is an implementation decision. Some implementations may not require that changes be immediately reflected in data dictionary 90. However, data dictionary 90 of the preferred embodiment is "closely coupled" to the actual state of the system's objects. This close coupling is achieved through the use of synchronization function 110, RQST data line 115, and reply queue 120. Synchronization function 110 of dictionary services 45 controls the rate at which data dictionary manager 85 queries audit journal 75. The WAIT portion of dictionary manager 85 initiates audit journal query activity whenever a request is received on RQST data line 115 or whenever a user defined time-out expires. The request that is sent by synchronization function 110 can be initiated by a user or by an application program. Data dictionary manager 85 responds to the request by processing all pending journal entries. When all of the journal entries have been applied to data dictionary 90, the user or application program is informed of such through the use of reply data queue 120. Since the system administrator is responsible for both the frequency of requests and data dictionary manager 85's time-out value the degree of coupling can be tailored to best fit system needs.

Checkpoint line 130 is used by data dictionary manager 85 to mark the most recently processed journal entry and to provide for recovery in the event of a system failure. When data dictionary manager 85 has exhausted the contents of audit journal 75, it logs its own checkpoint entry in audit journal 75 and enters a wait state. When dictionary manager 85 awakens, either through user stimulus 115 or through a time-out, it will eventually return its checkpoint entry. At this point, data dictionary manager 85 knows that it has effectively marked the last entry processed (i.e., the entry that was logged immediately before the checkpoint entry). To validate this fact, data dictionary manager 85 will log a commit entry into the audit journal. Data dictionary manager 85 then knows that when recovering from a system failure it must locate the last commit entry/checkpoint entry pair whenever it resumes journal processing. Data dictionary manager 85 further knows that it must begin with the entry that is logged immediately after the checkpoint entry to ensure that it processes any entries that were logged between the checkpoint entry and the commit entry. It is important to note that since a system failure could take place at any time, there may be "unpaired" checkpoint entries within audit journal 75. As mentioned above, dictionary manager 85 knows that it must find a commit entry/checkpoint entry pair to be certain that all of the journal entries have been processed. This means that dictionary services 45 must be able to tolerate an entry being processed processed more than once.

It is in this manner that data dictionary manager 85 is able to keep data dictionary 90 up to date with the status of system objects even over a system restart.

Figure 4A:
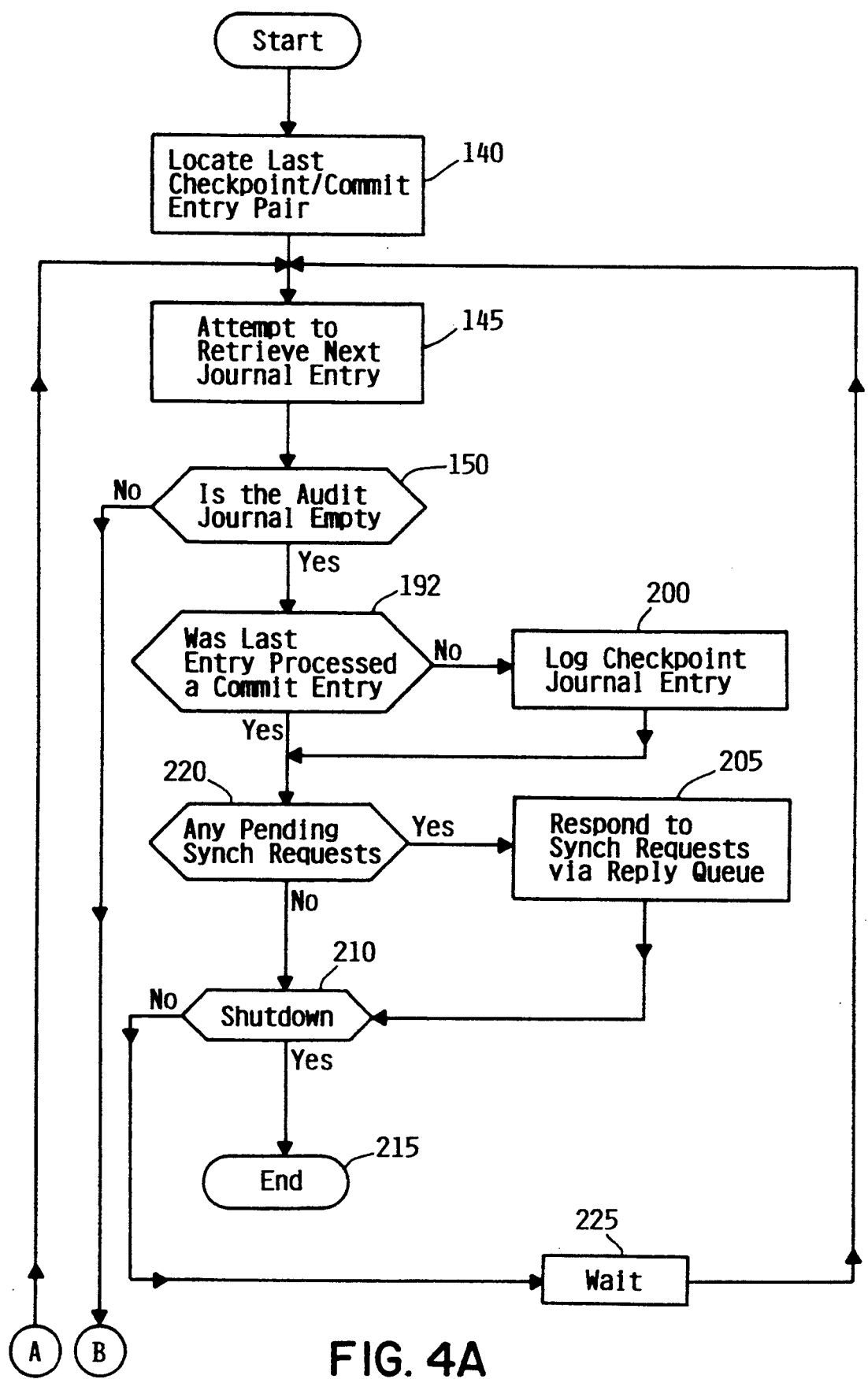
FIG. 4 is a flow diagram of the operation of the data dictionary manager according to the preferred embodiment.
Figure 4B:
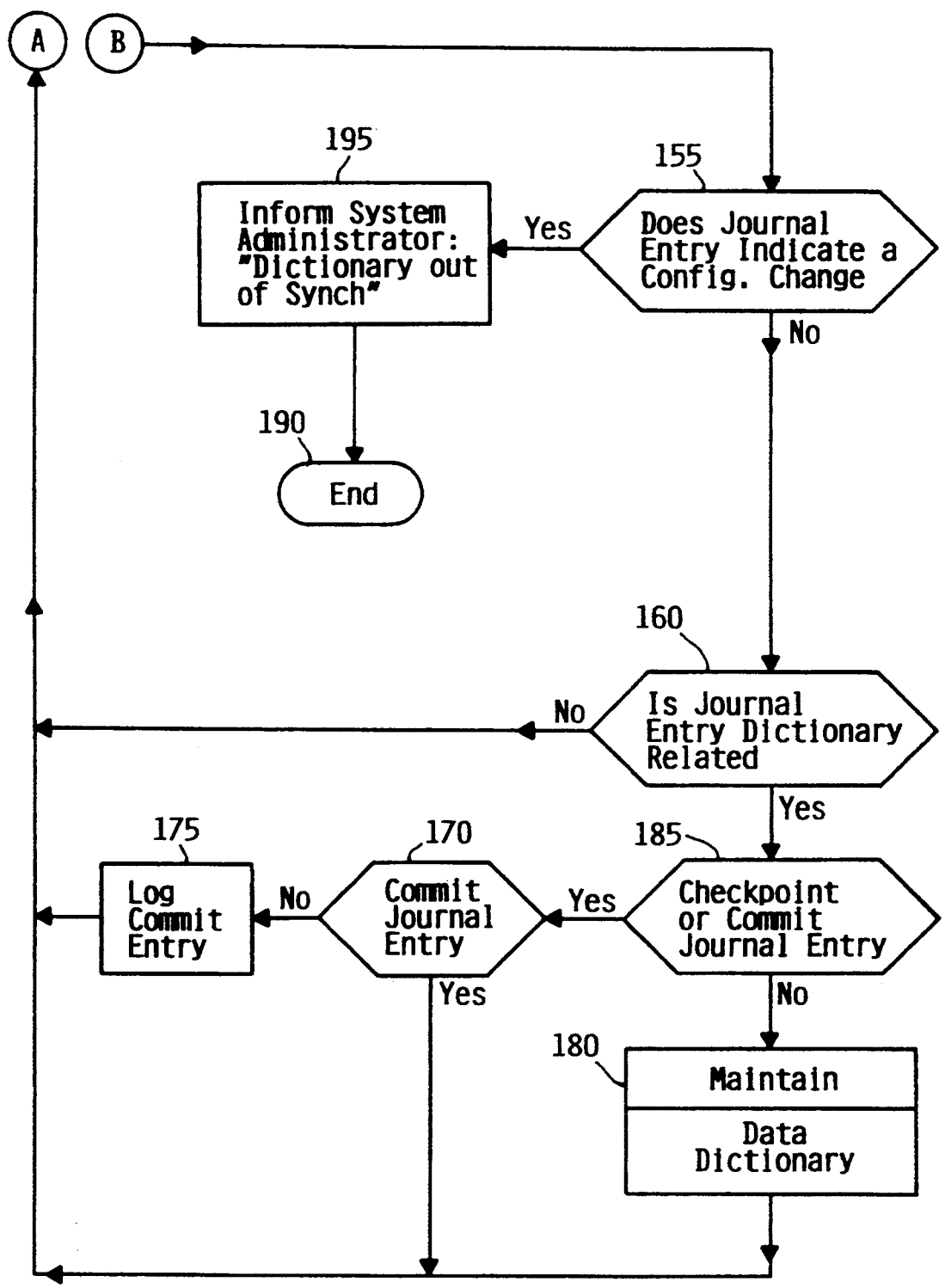

FIG. 4 shows a flow diagram of the activities of data dictionary manager 85. At startup, data dictionary manager 85 will find its starting point by locating the last commit entry/checkpoint entry pair 140. Since a commit entry is not logged until data dictionary manager 85 is certain that it has accurately marked its ending point with a checkpoint entry, data dictionary manager 85 knows that the first journal entry that requires processing will be the first journal entry that follows the checkpoint entry. Once the position is located, data dictionary manager 85, after attempting to retrieve a journal entry 145, first asks whether a journal entry exists 150. If the answer is "no", data dictionary manager 85 first asks whether the last entry returned was a commit entry 192. This latter test is in place to avoid placing multiple checkpoint entries into audit journal 75 during idle time.

If the answer to the test is no, dictionary manager 85 logs a checkpoint entry in audit journal 75 in step 200. In either case, data dictionary manager 85 will next check for any pending synchronization requests from dictionary services 45 in step 220. If there are synchronization requests pending, data dictionary manager 85 will respond 205 to the request via reply data queue 120. In either case, data dictionary manager 85 will eventually reach decision block 210. Here, data dictionary manager 85 will either proceed to wait state 225 or terminate 215. The choice depends on whether a system shutdown has occurred. In the preferred embodiment, the shutdown information is accessed via a system variable.

Referring back to the NO option of decision block 150, data dictionary manager 85 will next ask whether the journal entry indicates that a significant change to the configuration of journaling mechanism 38 has taken place 155. An example of such a change would be the re-configuration of journaling mechanism 38 to no longer record create activity. If this were to take place, data dictionary manager 85 could no longer keep data dictionary 90 up to date with the state of the system's objects. Therefore, data dictionary manager 85 would inform the system administrator of such 195 and terminate 190. If the journal entry does not indicate such a change in configuration, data dictionary manager 85 will ask whether the journal entry is dictionary related 160. The following journal entries of FIG. 2C are dictionary related: SV (system values), DO (deletes), CO (creates), OM (move/rename), OR (restore), CK (checkpoint), CT (commit). Since not all entries in audit journal 75 are dictionary related, data dictionary manager 85 must be able to ignore non-dictionary related journal entries. Hence, the process will return to block 145 whenever a non-dictionary related journal entry is detected.

If it is determined that the journal entry is dictionary related, data dictionary manager 85 then determines whether the entry is a checkpoint journal entry or a commit journal entry 185. If the journal entry is neither, data dictionary manager 85 proceeds to update data dictionary 90, block 180. For example, if a create entry (CO) was encountered, data dictionary manager 85 would use the data stored in the entry to apprise data dictionary 90 of the existence and nature of the new object. The process then repeats. If, instead, data dictionary manager 85 determines that the journal entry is either a checkpoint entry or a commit entry, it will, depending on exactly what type of an entry it is, either log a commit entry 175 or simply attempt to retrieve another journal entry 145.

Although the preferred embodiment of the subject invention uses the system's existing audit journal, other ways of storing the information are also possible. For example, the operating system could maintain a separate journal for use by the data dictionary manager. Indeed, virtually any means for storing information about changes to system objects could be used to provide the feedback capability of the present invention.

Although a specific embodiment of the invention has been disclosed along with certain alternatives, it will be recognized by those skilled in the art that additional variations in form and detail may be made within the scope of the following claims.

What is claimed is:

1. A method for maintaining a synchronized data dictionary comprising the steps of:

accessing objects coordinated by said dictionary, said objects being contained in a data base and accessed by an application program;

affecting changes upon said objects, said objects being changed by an application program;

recording information about said changes in a record which is separate from said data dictionary and from said data base, said information being recorded by a journaling mechanism; and updating said data dictionary to reflect said changes, said data dictionary being updated by a data dictionary manager.

2. The method of claim 1 wherein said recording step comprises the step within said journaling mechanism of placing an entry in an audit journal for each of said changes.

3. The method of claim 2 wherein said updating step comprises tile steps within said data dictionary manager of:

retrieving said information about said changes from said audit journal;

and ensuring that said information is reflected by said data dictionary.

4. A method for maintaining a data dictionary across a system failure, said method comprising the steps within a data dictionary manager of:

marking am audit journal with a first mark, said audit journal containing audit journal entries, said audit journal entries containing information about changes to a data bse, said first mark being used to indicate the location of a last audit journal entry processed;

validating said last entry processed with a second mark;

returning to the first instance of said first mark that has been validated by said second mark; and updating said data dictionary so that said data dictionary is synchronized with said data base.

5. The method of claim 4 wherein said marking step comprises the step of using a checkpoint entry.

6. The method of claim 4 wherein said validating step comprises the step of using a commit entry.

7. A method for adjusting the synchronization of a data dictionary, said method comprising the steps:

within a journaling mechanism of:

recording information about changes to system objects in an audit journal, where said information its in the form of one entry per change;

within a data dictionary manager of:

accepting as prompts synchronization requests, where said synchronization requests are requests to process said entries of said edit journal;

waking whenever a timer expires, said timer being set to an adjustable timeout value; and responding to said synchronization requests and said timer expiration by retrieving said entries from said audit journal and updating said data dictionary accordingly.

8. An apparatus for maintaining a synchronized data dictionary comprising:

means for accessing objects coordinated by said dictionary, said objects being contained in a data base and accessed via an application program;

means for affecting changes upon said objects;

means for recording information about said changes in a record separate from said data dictionary and from said data base; and means for updating said data dictionary to reflect said changes.

9. The apparatus of claim 8 wherein said means for recording comprises means for placing an entry in an audit journal for each of said changes.

10. The apparatus of claim 9 wherein said means for updating comprises:

means for retrieving said information about said changes from said audit journal; and means for ensuring that said information is reflected by said data dictionary.

11. An apparatus for maintaining a data dictionary across a system failure, said apparatus comprising:

means for marking an audit journal with a first mark, said audit journal containing audit journal entries, said audit journal entries containing information about changes to a data base, said first mark being used to indicate the location of a last audit journal entry processed;

means for validating said last entry processed with a second mark;

means for returning to the first instance of a said first mark that has been validated by a said second mark; and means for updating said data dictionary such that said data dictionary is synchronized with said data base.

12. The apparatus of claim 11 wherein said means for marking comprises a checkpoint entry.

13. The apparatus of claim 11 wherein said means for validating comprises a commit entry.

14. An apparatus for adjusting the synchronization of a data dictionary, said apparatus comprising:

a journaling mechanism which comprises means for recording information about changes to system objects in an audit journal, where said information is in the form of one entry per change; and a data dictionary manager which comprises:

means for accepting as prompts synchronization requests, where said synchronization requests are requests to process said entries of said audit journal;

means for waking whenever an adjustable timeout occurs; and means for responding to said synchronization requests and said timeout by retrieving said entries from said audit journal and updating said data dictionary accordingly.

15. A data dictionary manager comprising:

means for accessing objects coordinated by said dictionary, said object being contained in a data base and accessed via an application program;

means for affecting changes upon said objects;

means for recording information about said changes in a record which is separate from said data dictionary and from said data base; and means for updating said data dictionary to reflect said changes.

16. The data dictionary manager of claim 15 wherein said means for recording comprises means for placing an entry in an audit journal for each of said changes.

17. The data dictionary manager of claim 16 wherein said means for updating comprises:

means for retrieving said information about said changes from said audit journal; and means for ensuring that said information is reflected by said data dictionary.

18. A data dictionary manager which maintains a data dictionary's integrity across a system failure, said data dictionary manager comprising:

means for marking an audit journal with a first mark, said audit journal containing audit journal entries, said audit journal entries containing information about changes to a data base, said first mark being used to indicate the location of a last audit journal entry processed;

means for validating said last entry processed with a second mark;

means for returning to the first instance of a said first mark that has been validated by a said second mark; and means for updating said data dictionary such that it is synchronized with said data base.

19. The data dictionary manager of claim 18 wherein said means for marking comprises a checkpoint entry.

20. The data dictionary manager of claim 18 wherein said means for validating comprises a commit entry.

21. A data dictionary manager which allows for the adjusting of the synchronization of a data dictionary, said data dictionary manager comprising:

means within said data dictionary manager for recording information about changes to system objects in an audit journal, where said information is in the form of one entry per change;

means within said data dictionary manager for accepting as prompts synchronization requests, where said synchronization requests are requests to process said entries of said audit journal;

means within said data dictionary manager for waking whenever an adjustable timeout occurs; and means within said data dictionary manager for responding to said synchronization requests and said timeout by retrieving said entries from said audit journal and updating said data dictionary accordingly.

* * * * *